July 8, 1924.
T. SHIMIZU
AUTOMOBILE FENDER
Filed Nov. 16, 1923
1,500,730
2 Sheets-Sheet 1
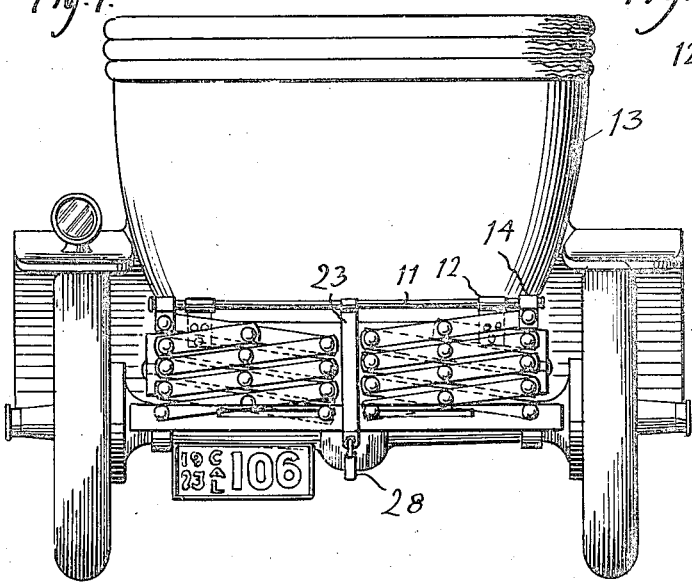
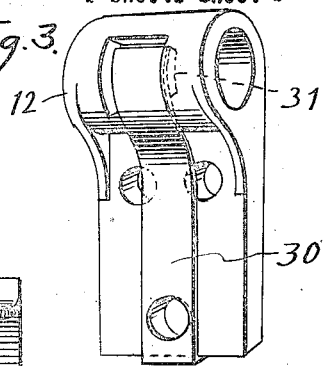
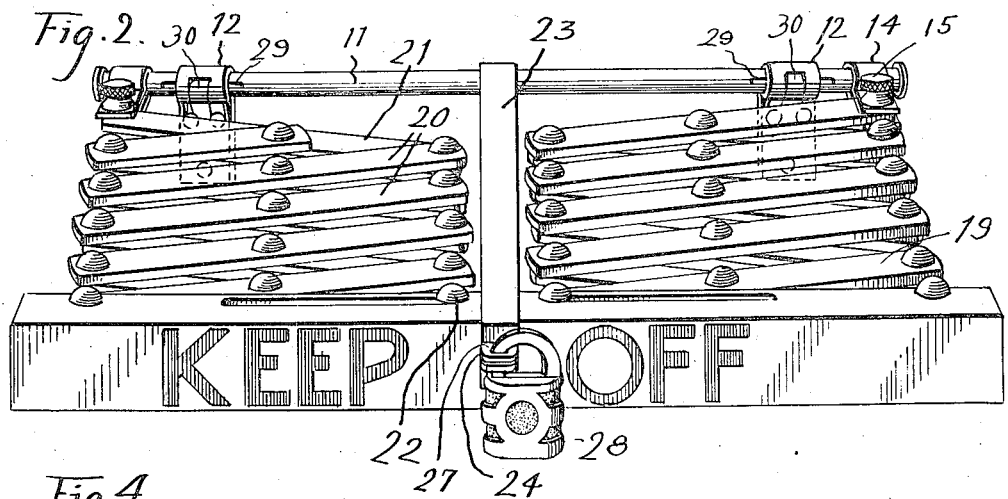
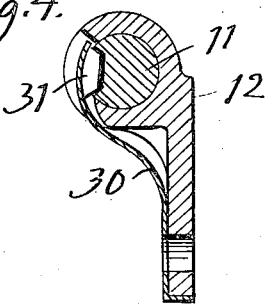
INVENTOR:
TOKUTA SHIMIZU.
BY ATTY: Edward T. Kojima

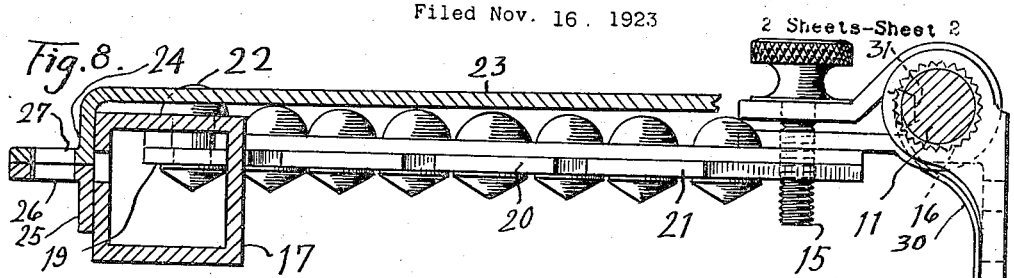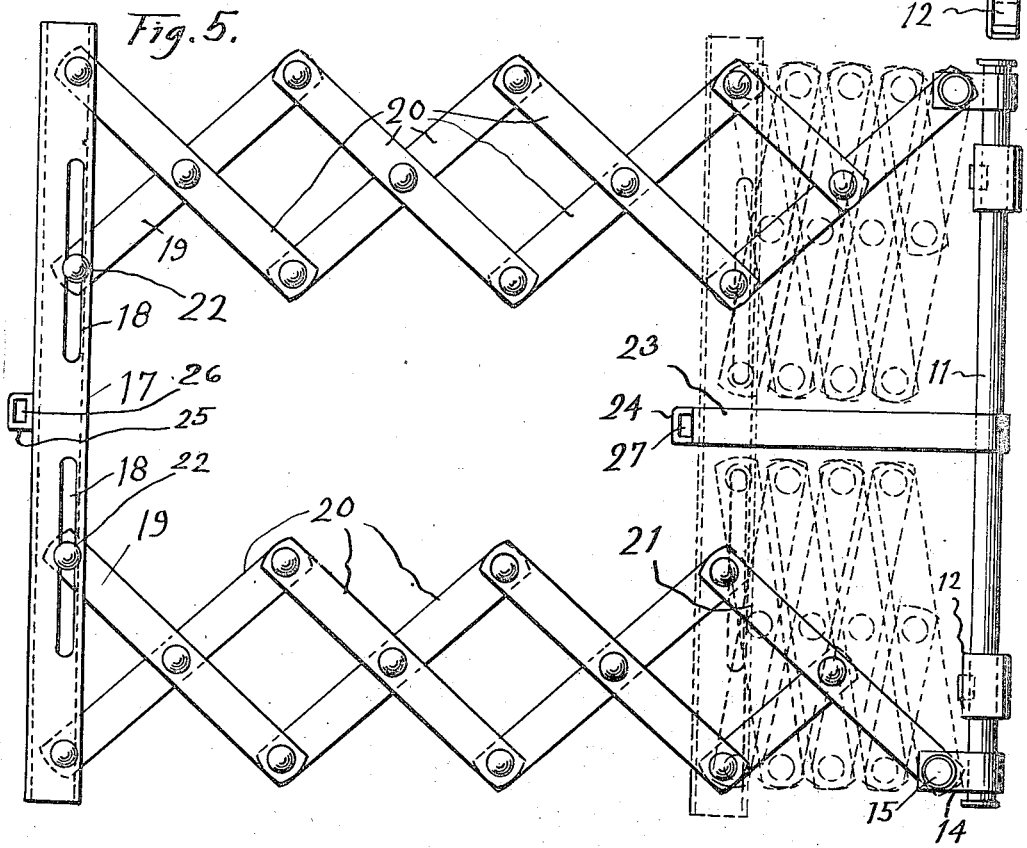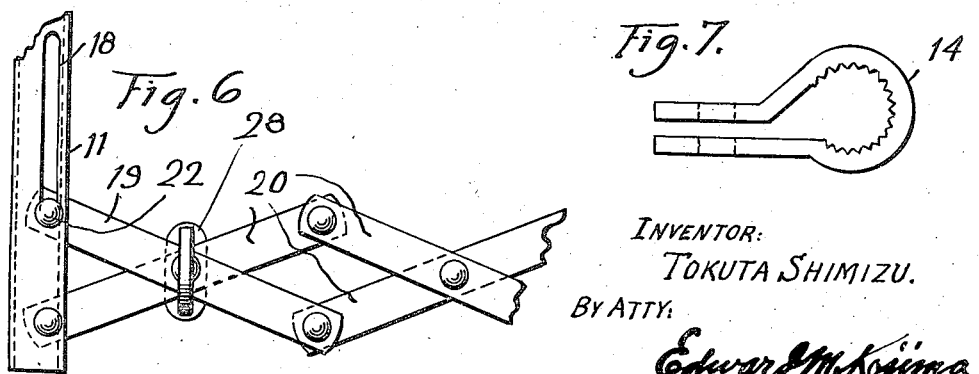

Patented July 8, 1924.

1,500,730

UNITED STATES PATENT OFFICE.

TOKUTA SHIMIZU, OF LOS ANGELES, CALIFORNIA.

AUTOMOBILE FENDER.

Application filed November 16, 1923. Serial No. 675,160.

*To all whom it may concern:*

Be it known that I, TOKUTA SHIMIZU, a subject of the Emperor of Japan, residing in the city and county of Los Angeles and State of California, have invented a new and useful Automobile Fender, of which the following is a specification.

This invention relates to automobile bumpers and fenders which may be extended for protection of the vehicle and which may be collapsed to a small limit when desired.

A primary object of the invention is to provide a fender which may be extended to different positions from the body of the automobile, and especially from the rear of the vehicle, so that, when the automobile is left standing for a time, the driver will, on collapsing the fender, have a sufficient space for operating the vehicle and driving the same from a limited parking space.

Another object is to provide a collapsible carrier for luggage, having a normal and an extended operative position, means for retaining the same in either position, and means for collapsing the same to a folded or inoperative position when not in use.

With the foregoing and other objects in view, the invention resides in the combination of parts and details of construction hereinafter described and claimed; it being understood that changes in the precise embodiment of the invention herein disclosed, may be made within the scope of what is claimed, without departing from the spirit of the invention.

In the drawings, Figure 1 is a rear view of an automobile having my improved fender applied thereto. Fig. 2 is a perspective detail view of the fender. Fig. 3 is a detail view of the fender bracket. Fig. 4 is a fragmentary and detail view showing the spring for holding the fender in operative position. Fig. 5 is a top plan view of the fender in partly extended position. Fig. 6 is a fragmentary view of the fender, showing a lock applied to maintain the fender in extended position. Fig. 7 is a side and detail view of a clamp for connecting the collapsible elements to the supporting elements of the fender. Fig. 8 is an enlarged sectional view of the fender.

Referring to the drawings, my improved fender consists of a bar 11, supported by brackets 12, which may be attached to any convenient part of the automobile 13; in the present instance being shown attached to the rear end of the automobile frame. Clamps 14, are secured by clamping bolts 15, to toothed sections 16, of the bar 11. The bumper element 17, is provided with slots 18, and is connected by a series of "lazy-tong" elements 19, 20 and 21, with clamps 14. The movable elements 19, have pins 22, extending through slots 18 and working therein. The bolts 15 are screw-connected to the movable elements 21.

In inoperative position, the bumper 17 depends from bar 11, and the device folds against the automobile body. A latch member 23, pivotally mounted on bar 11, has an angular extremity 24 engaging with bumper 17, and retaining the lazy-tong elements 19, 20 and 21 in collapsed position. Bumper 17 is provided with a lug 25, having an aperture 26, and member 23 has a corresponding aperture 27. A pad-lock 28, passing through apertures 26 and 27, secures the latch member in locking position.

In the fully extended position of the device, the padlock may be applied at any central intersecting point of the elements 20, as shown in Fig. 6, and so applied, serves to maintain the device in operative position. To support the fender in a horizontal operative position, I construct the bar 11, with grooves, 29, and construct brackets 12, with spring locking members 30, having integral locking lugs, 31, engaging with grooves 29 in the horizontal position of the fender.

In use, the operator having parked the automobile, will raise the fender from its depended position to a horizontal position; allowing the spring locking members 30 to engage with grooves 29. The operator then pulls the bumper to its extended position and applies the padlock 28 at any central intersection of the elements 20. This maintains the device in operative position. This serves to maintain other automobiles at a distance from the rear of the operator's automobile. On collapsing the device to its inoperative position, the operator has a space at the rear in which to manipulate the vehicle to drive the same from parking position. In collapsed position of the elements 19, 20 and 21, the device serves as an ordinary rear fender, and may be used as a supporting means for luggage; the collapsed lazy-tong elements affording a platform therefor. If necessary, straps (not shown), may be applied, connecting the bumper member and the automobile body. The device, while shown and primarily intended for a fender for the rear of an automobile, may be modified for attachment at any desired point for analogous purposes.

What is claimed is:

1. An automobile fender having a normal and an extended horizontal operative position and a depending inoperative position, means for locking the fender in its operative positions, and spring means to hold the fender in its horizontal operative positions.

2. An automobile fender having normal and extended horizontal operative positions, and a depending inoperative position, means for locking the fender in normal and extended positions, and spring detent means to hold the fender in its horizontal positions.

3. In an automobile fender, a pair of brackets adapted to be attached to an automobile body, a bar rotatively mounted therein, spring detent means engaging the bar to prevent rotation thereof, a bumper member, and collapsible lazy-tong elements connecting the bumper member and the rotatable bar.

4. An automobile fender having a relatively horizontal operative position and a depending inoperative position, and spring detent means to hold the fender in its horizontal position, and locking means to maintain the fender in collapsed or extended positions.

5. In an automobile fender, a pair of attachment brackets adapted to be affixed to the automobile, a bar rotatably mounted in the brackets, and having grooves therein, spring detent members, lugs on the detent members adapted to engage with the grooves in the rotatable bar to prevent movement thereof, toothed clamp members mounted on the rotatable bar, a bumper having a normal and an extended operative position, lazy-tong elements connecting the bumper with the clamp members, a retaining lever pivotally mounted on the rotatable bar and engaging with the bumper in its normal position, a lug on the bumper, and a padlock to lock the retaining lever to the lug in the normal position of the bumper, and adapted to engage with the lazy-tong elements at a central intersection thereof, to lock the bumper in its extended position.

6. In an automobile fender, a pair of attachment brackets adapted to be affixed to an automobile, a bar rotatably mounted in the brackets, means to prevent rotation of the bar, clamp members mounted on and adjustable relative to the rotatable bar, a bumper member having normal and extended operative positions, collapsible elements connecting the bumper and clamp members, and means for locking the bumper member in normal and extended positions.

7. The combination with a bumper member bearing the insignia "Keep off," of supporting brackets adapted to be affixed to an automobile, a supporting bar mounted therein, clamp members mounted on the supporting bar, and collapsible lazy-tong members interposed between and connecting the bumper with the supporting bar.

In testimony whereof, I hereunto affix my signature.

TOKUTA SHIMIZU.